Aug. 28, 1923.
L. F. CHANEY
RADIATOR INDICATOR
Filed Dec. 15, 1922
1,466,117
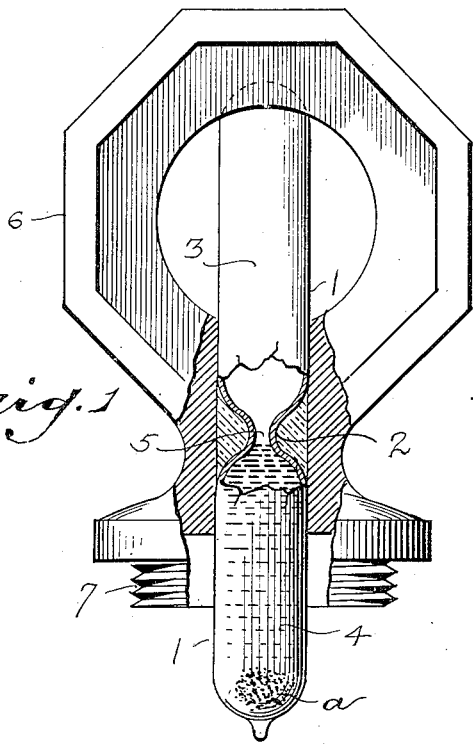
Fig.1
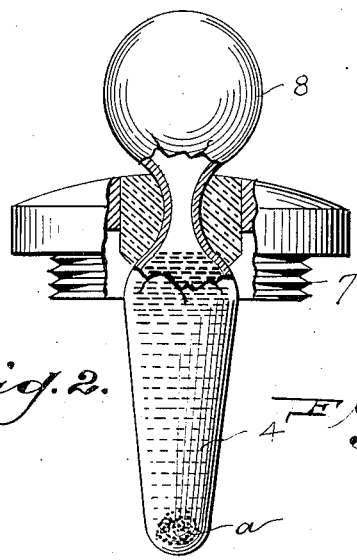
Fig.2
Fig.5
Fig.4
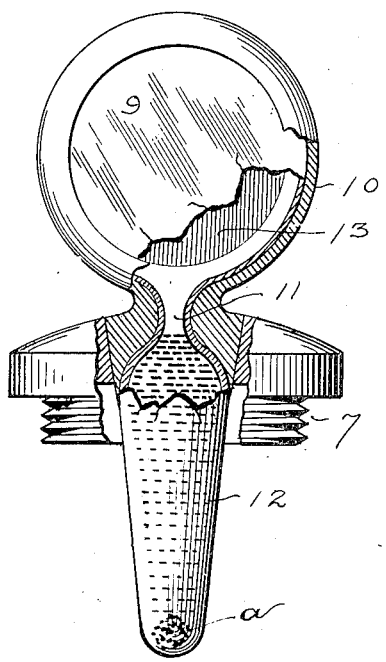
Fig.3
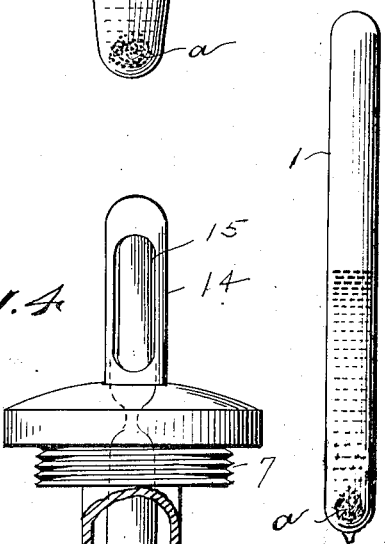
Inventor
Lee F. Chaney
By F. L. Walker
Attorney Patented Aug. 28, 1923.

1,466,117

UNITED STATES PATENT OFFICE.

LEE F. CHANEY, OF SPRINGFIELD, OHIO.

RADIATOR INDICATOR.

Application filed December 15, 1922. Serial No. 607,215.

*To all whom it may concern:*

Be it known that I, LEE F. CHANEY, a citizen of the United States, residing at Springfield, in the county of Clark and State of Ohio, have invented certain new and useful Improvements in Radiator Indicators, of which the following is a specification.

My invention relates to a thermally operated signal or indicator for indicating excessive temperature as distinguished from a thermometer or measuring instrument for determining relative degrees of temperature or measuring the amount of excessive temperature.

The invention is applicable to various thermal chambers or units, such as ovens, steam pipes or even refrigerating chambers, wherein it is desirable to know when the temperature exceeds a predetermined maximum degree or danger point. It will find, however, a wide range of usefulness when applied to the cooling or circulating system of a hydro-carbon explosive engine or more particularly to a radiator of a motor vehicle.

The signal device forming the subject matter hereof depends not upon the relative expansion of a fluid body, nor the proportionate movement of an indicating member, as is the case with a measuring instrument or thermometer, but depends upon the ebullition or boiling of a liquid body in a confining chamber having a restricted outlet through which the liquid is spurted spasmodically under the influence of abnormal heat conditions, thus producing a geyseric effect indicative of excessive temperature or a dangerous condition, or the mere fact that the temperature has exceeded a maximum standard without attempting to measure or indicate the degree of temperature. To this end the simplified embodiment of the invention as illustrated in the drawing comprises a glass tube, closed at its opposite ends and medially constricted to afford two chambers intercommunicating through a restricted passage. One of these chambers is filled with a liquid having a comparatively low boiling point, dependent of course upon the conditions under which it is to be used. For radiator indications or use in the circulatory system of explosive engine, or a connection with other hot water or steam apparatus, the indicating fluid may be alcohol colored with aniline dye, sufficient to give it distinct visibility. For other purposes, as for instance, in connection with chill rooms or refrigerating apparatus, wherein the signal is desired to operate at materially lower temperature, the liquid may be sulphur dioxide or other chemical solutions possessing a relatively low boiling point. One of the chambers of the signal device is filled with such indicating liquid. The particular embodiment of the device shown in the drawing is a glass tube having its lower portion filled with a colored liquid which will boil at a predetermined temperature. The thermal point of operation may be varied to cause it to ebullate at different temperatures either by modifying the liquid or by partially exhausting the remainder of the tube. The liquid filled portion is inserted within the thermal compartment with the normally empty portion exposed to view, and preferably to a cooling influence. The ebullition of the liquid due to increased temperature in the compartment will cause it to spurt into the exposed portion of the tube and temporarily stain its walls. Condensation of vapors within the exposed portion of the tube will wash the stain from the walls preparatory to the next active movement. The signals continue intermittently so long as the predetermined temperature is exceeded within the thermal compartment, the frequency varying with variation of excess temperature.

The object of the invention is to simplify the structure as well as the means and mode of operation of thermal test signals, whereby they will not only be cheapened in construction, but will be more efficient in use, positive in operation, uniform in action, easily installed and unlikely to get out of repair.

A further object of the invention is to afford a signal or indicator, which in its operation will produce a condition of radical change calculated to readily and quickly attract the eye of the observer. A thermometer as usually employed for such purposes changes its indication so gradually and its appearance under different temperature conditions is so slightly different that it does not readily and quickly attract the eye to the varying indications. The present invention is designed to overcome this objection by affording a signal device wherein the action will be marked and distinctive in character and adapted by its sudden and violent action to draw attention.

A further object of the invention is to provide a device which may be easily and readily applied to a wide range of useful applications, which may be readily and quickly installed and which will possess no intricate or complicated working parts.

With the above primary and other incidental objects in view as will more fully appear in the specification, the invention consists of the features of construction, the parts and combinations thereof, and the mode of operation or their equivalents as hereinafter described and set forth in the claims.

In the accompanying drawings, wherein are shown the preferred, but obviously not necessarily the only form of embodiment of the invention. Fig. 1 is a front elevation of the thermal signal forming the subject matter hereof, partly in section, and mounted for application to an automobile radiator or other thermal chamber, of whatever character or purpose. Fig. 2 is a similar view also partly in section of the signal indicator, employing a spherical indicator chamber in lieu of the elongated tubular chamber shown in Fig. 1. Fig. 3 is a further modification employing the disc like indicator member, to be temporarily tinted or stained by the operation of the signal. Fig. 4 is a side elevation partly in section of the signal device enclosed in a different form of protective mounting and further provided with an insulating closure about the fluid chamber, whereby the device is rendered operative only when the fluid level within a radiator or circulatory system of an explosive engine falls below a predetermined level. Fig. 5 illustrates a modification wherein a tube of comparatively small bore, without the medial contraction, is employed.

Like parts are indicated by similar characters of reference throughout the several views.

In its simple form the thermal signal comprises a glass tube 1, contracted medially at 2, to form two intercommunicating chambers 3 and 4, as shown in Fig. 1. These chambers intercommunicate through the restricted passage 5, within the constriction 2. The lower chamber 4 is filled with a colored liquid having a boiling point approximately equivalent to the predetermined maximum temperature of which warning is to be given by the signal. Various liquids may be employed to afford a signal operable at different temperatures. For example a signal device to be employed in connection with the steam apparatus or to be mounted upon the radiator of a motor vehicle or to operate in conjunction with a circulating cooling system of explosive engines, the indicating liquid is preferably alcohol containing a quantity of aniline dye. Such a colored solution will ordinarily boil or ebullate at approximately one hundred sixty-five to one hundred seventy degrees of temperature. This point of ebullition, however, may be varied within a reasonable range by varying degrees of exhaustion of the tube 1. Thus by lowering the external pressure, or producing a greater vacuum within the tube, the liquid will ebullate at a lower temperature than otherwise. If the indicator is employed in connection with a refrigerating apparatus whereby the signal is to be operated at a comparatively low temperature, other liquids as for example sulphur dioxide may be employed. To the contrary if it is to operate only upon an extremely high temperature, a liquid possessing a higher boiling point as for instance water may be used.

Whatever character the indicating liquid may be, the lower chamber 4 is substantially filled with such colored liquid and when caused to ebullate by subjection to excessive heat conditions, there will occur within the chamber 4 explosions, or violent agitation, which will cause the liquid to be discharged in spurts through the intercommunicating passage 5, into the upper and exposed indicating chamber 3. There is thus produced a geyseric effect, by which the colored liquid is caused to stain the transparent walls of the upper indicator section or chamber 3. Not only is the changed appearance and color of the indicator chamber visible to the observer, but the spouting of the miniature geyser within such chamber is also visible, the unusual and violent motion of which readily attracts attention. The colored liquid discharged into the indicator chamber will gradually drain back into the lower chamber 4 to be again ejected in the same manner. After each operation a thin film of colored liquid will adhere to the interior wall of the indicator chamber 3, which color itself may gradually disappear to be replaced by another colored film at the next operation.

At each spurting or ejection of colored liquid into the indicator chamber, there will be also discharged a quantity of vapor. The indicator chamber 3, being exposed to air currents and consequently the walls thereof being comparatively cool, such vapors will readily condense upon the walls of the indicator chamber, and such condensation will serve to wash and more quickly cleanse the indicator wall of the strain of colored liquid, which adheres thereto. There will be no colored liquid discharged and no indication in the upper chamber 3 until the predetermined maximum temperature has been exceeded. Naturally the greater the temperature, the more violent will be the ebullition of the liquid. However, the degree of temperature cannot be determined by this instrument. The present device is thus not a measuring instrument, nor a temperature indicator in any sense, but is only a signal device, adapted by its radical change of character and appearance to attract attention. For this reason the present signal device is not to be confused with thermometers or other devices of like character for measuring temperatures, or for indicating degrees of temperature, throughout any appreciable range.

It has been found in practice that the ebullition or violence of agitation of the liquid within the lower chamber 4 will be materially increased and the efficiency of the device improved by introducing into the liquid a small quantity of a granular insoluble material, such as sand or ground glass. Such loose material seems to afford a starting point for the agitation of the liquid. Small particles of this sand or granular material may be carried through the passage 5 into the indicator chamber, but will do no harm as such granular material is again washed back into the lower chamber by the succeeding operations of the device.

In Fig. 1 of the drawing, the signal device has been shown mounted in an ornamental mounting or head 6, having a screw threaded neck 7, which may be engaged in the filling orifice of an automobile radiator, or in any suitable screw threaded opening of an oven, chill room, or other compartment, the temperature of which is to be tested.

In Fig. 2 there is shown a modification, where in lieu of the elongated indicator chamber 3, there is employed a spherical chamber 8, while the liquid chamber 4' is somewhat larger in proportion to the indicator chamber than that shown in Fig. 1.

In Fig. 3 there is shown a modification, wherein the indicator chamber may comprise two parallel discs 9, spaced apart in a suitable mounting 10, the intermediate space communicating through the passage 11 with the liquid chamber 12. However, in lieu of the spaced transparent discs, one of these discs, as the disc 13, may be of opaque material, preferably white, while the disc toward the observer may be transparent, so that the coloring of the opaque white disc may be observed after each operation of the signal. The devices as shown in Figs. 2 and 3 are also mounted upon a screw threaded cap or closure which may form the closure of an automobile radiator filling orifice.

In Fig. 4 there is shown the same form of signal device as illustrated in Fig. 1, such as the indicating chamber 3 is enclosed in a tubular housing 14, having at one side an observation opening 15. There may be several of these openings 15, arranged opposite each other, in order that the observer may look entirely through the device, or in lieu thereof, one observation space with a white or other background on the opposite side of the housing, by which the color indicating fluid will be suitably displayed.

In Fig. 4 there is shown an addition to the disclosure of the preceding figures, consisting of a tube 16 of heat insulating material, which surrounds and protects the fluid chamber 4, and extends downward therefrom with its lower open end submerged in the body 17 of water within an automobile radiator or other like container. A quantity of air will be trapped within this tube 16 by the water contents of the radiator. The fluid chamber 4 will not be subjected to the head of the chamber or radiator until the water level therein falls below the end of the protecting tube 16, which will allow the steam to enter within the tube and come into direct contact with the fluid chamber 4. Thus the signal may be employed to indicate a dangerous lowering of the water level, as the liquid within the chamber will not ebullate and discharge into the upper chamber until the water level is lowered beyond the end of the tube 16.

In Fig. 5 is shown a modification comprising a straight tube of comparatively small bore without the medial contraction. The liquid is contained in the lower portion of the tube and propelled upward by the formation of bubbles. This form of device is suitable for stationary installations where the instrument is not subject to excessive vibration. The medial contraction not only enables the employment of a larger tube with a greater quantity of indicating liquid, but it also prevents splashing of the fluid when employed upon a motor vehicle or analogous installations. In constructing the form of device illustrated in Fig. 5, the diameter of the bore of the tube is preferably not materially greater than that of the average bubble formed in the liquid by subjection to heat. For most efficient service, the bubbles should fill the bore carrying upward above them the overlying body of liquid. If this condition exists the agitation will be violent and the upper portion of the tube will be intermittently stained or colored as before described. If, however, the core is so large as to permit relative passage of the bubbles through the overlying liquid the disturbance will be less violent though sufficient to indicate an abnormal rise of temperature.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not to be limited to the specific details shown, but the means and construction herein disclosed comprises the preferred form of several modes of putting the invention into effect, and the invention is therefore claimed in any of its forms or modifications within the legitimate and valid scope of the appended claims.

Having thus described my invention, I claim:

1. In a radiator signal for motor vehicles and the like, a glass tube closed at its ends and medially constricted to afford two chambers communicating through a restricted passage, a body of colored liquid in one of the chambers, said liquid filled chamber being subjected to heat generated within the radiator, the other chamber being exposed to view beyond the radiator, the ebullition of the liquid under influence of abnormal heat conditions within the radiator causing intermittent spurts of the liquid to appear in the exposed chamber.

2. A heat signal comprising an indicator chamber having a transparent wall, a confined body of colored liquid having access to the indicator chamber through a restricted passage, said colored liquid being intermittently projected through such restricted passage into the indicator chamber with geyseric effect by the ebullition of the body of liquid under influence of the heat.

3. In a heat signal of the character described, a signal chamber having a transparent wall, a second chamber containing a quantity of colored liquid communicating with the first mentioned chamber through a restricted orifice, the signal chamber being partially exhausted whereby the liquid will ebullate at a low temperature, the ebullition of the liquid causing intermittent spurts of the liquid through the restricted orifice into the signal chamber.

4. In a heat signal, an indicator chamber having a transparent wall, a second chamber communicating with the indicator chamber through a restricted orifice, a body of colored liquid possessing a low boiling point, normally contained in the second chamber, but intermittently projected into the indicator chamber with geyseric effect by the ebullition of the liquid under influence of temperature less than the boiling point of water.

5. In a heat signal, an indicator chamber having a transparent wall, a second chamber normally containing a body of colored liquid and communicating with the discharge chamber through a restricted passage, and a quantity of granular insoluble material loosely contained within the body of colored liquid, the liquid being subject to ebullition under the influence of heat by which it is intermittently discharged into the indicator chamber.

6. In an indicator of the character described, the combination with a motor cooling system or the like, of a container for colored liquid having a portion extending exteriorly of the cooling system and in view of an observer, and a second portion projecting within the cooling system and subjected to the internal temperature thereof, and a body of colored liquid normally contained within the inner portion and subject to ebullition under influence of abnormal heat conditions within the cooling system whereby the liquid is intermittently discharged with geyseric effect into the visible portion of the container.

7. Means for indicating the thermal conditions within a chamber normally sealed from view, comprising the combination with a chamber subject to varying thermal conditions, of a container for coloring material extending within the chamber, an indicator exteriorly of the chamber and exposed to view of a distant observer, a quantity of stain material normally within the container and subjected to the varying thermal conditions within the chamber and having communication with the indicator, said stain material being expelled from the container to intermittently and temporarily discolor the indicator under the influence of abnormal temperature conditions, by which the change of temperature within the chamber may be indicated to a distant observer.

8. Means for indicating the thermal condition of the engine, of an automobile provided with a liquid circulation cooling system including a radiator comprising the combination with the radiator, of a chamber having a restricted orifice and subjected to the varying thermal conditions within the radiator a body of colored liquid within the chamber said liquid being caused to spurt intermittently with geyseric effect through said restricted orifice into the range of vision from the driver's seat of the automobile by the ebullition of the liquid under the influence of abnormal temperature conditions within the radiator.

9. Means for indicating thermal conditions within a chamber normally closed to observation comprising the combination with a chamber subject to varying thermal conditions, of a container for a body of indicating liquid extending within the chamber and having a restricted outlet orifice, a body of indicating liquid within the container and normally concealed from view, said liquid being intermittently discharged through the outlet orifice with geyseric effect into view of an observer under the influence of abnormal temperature conditions within the chamber.

10. A thermal indicator including a chamber subject to varying conditions of temperature and having a restricted outlet orifice, a body of liquid within the chamber, and a quantity of granular insoluble material also in said liquid facilitating the ebullition of the liquid under abnormal heat conditions whereby the liquid is intermittently spurted from said outlet orifice with geyseric effect.

11. In an indicator of the character described, the combination with a liquid containing chamber, of a bulb containing thermally sensitive material extending within the chamber in elevated relation above the normal liquid level, an exterior signal device to indicate abnormal temperature conditions with which the bulb communicates, characterized by a normally liquid sealed heat insulating tube surrounding the control bulb and having an opening below the normal liquid level within the thermal chamber whereby the bulb is subjected to increased heat condition, when the tube is opened by the lowering of the fluid level.

12. A construction wherein a thermally sensitive indicator extends within an automobile radiator or like container above the liquid level thereof and is provided with external indicating means, characterized by a liquid level controlled heat insulating enclosure for the controlling portion of the indicator within the liquid container, affording protection to said control portion of the indicator so long as the liquid does not fall below a predetermined level, said enclosure being opened upon abnormal lowering of the liquid level to expose the control portion of the indicator to the temperature within the container.

13. A construction wherein a thermally sensitive indicator extends within an automobile radiator or like container, above the liquid level thereof and is provided with external indicating means, characterized by a liquid sealed heat insulating enclosure for the control portion of said thermally sensitive indicator, the liquid seal of said heat insulating enclosure remaining unbroken and the indicator protected against the thermal condition existing above the liquid level condition within said container above a predetermined level, the abnormal lowering of the liquid level serving to open said insulating enclosure and expose the control portion of the indicator to the existing temperature condition within the container.

In testimony whereof I have hereunto set my hand this 7th day of November, A. D. 1922.

LEE F. CHANEY.

Witnesses:
  A. C. LINK,
  CATHERINE E. SHEEHAN.